United States Patent
Aiso et al.

(10) Patent No.: US 8,545,137 B2
(45) Date of Patent: Oct. 1, 2013

(54) CUTTING METHOD OF STEEL FOR MACHINE STRUCTURAL USE

(75) Inventors: Toshiharu Aiso, Tokyo (JP); Kei Miyanishi, Tokyo (JP); Suguru Yoshida, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 109 days.

(21) Appl. No.: 13/377,018

(22) PCT Filed: Mar. 3, 2011

(86) PCT No.: PCT/JP2011/054932
§ 371 (c)(1),
(2), (4) Date: Dec. 8, 2011

(87) PCT Pub. No.: WO2011/122233
PCT Pub. Date: Oct. 6, 2011

(65) Prior Publication Data
US 2012/0085209 A1    Apr. 12, 2012

(30) Foreign Application Priority Data

Mar. 30, 2010    (JP) ................................ 2010-078231

(51) Int. Cl.
*B23B 51/06*    (2006.01)
(52) U.S. Cl.
USPC ............................... 408/1 R; 408/56; 408/57
(58) Field of Classification Search
USPC ......................................... 408/56, 57, 59, 60
IPC ....................................................... B23B 51/06
See application file for complete search history.

(56) References Cited

U.S. PATENT DOCUMENTS

| | | | |
|---|---|---|---|
| 3,577,808 A | * | 5/1971 | Visser .............................. 408/61 |
| 4,279,646 A | | 7/1981 | Kato et al. |
| 4,345,668 A | * | 8/1982 | Gaunt .............................. 184/29 |

(Continued)

FOREIGN PATENT DOCUMENTS

| DE | 19917219 A1 | 10/2000 |
|---|---|---|
| EP | 2159294 A1 | 3/2010 |

(Continued)

OTHER PUBLICATIONS

EIC Search, May 17, 2013, pp. 1-32.*

(Continued)

*Primary Examiner* — Eric A Gates
(74) *Attorney, Agent, or Firm* — Birch, Stewart, Kolasch & Birch, LLP

(57) ABSTRACT

The cutting method of steel for machine structural use includes: forming a mist by mixing a cutting fluid supplied at a supply rate of 0.01 ml/hour to 200 ml/hour and an oxidizing gas containing, by volume %, 21% to 50% of oxygen; and cutting the steel for machine structural use while the mist is blown on the cutting edge surface of a tool and the surface of the steel for machine structural use, wherein the steel for machine structural use includes, by mass %: C: 0.01% to 1.2%, Si: 0.005% to 3.0%, Mn: 0.05% to 3.0%, P: 0.001% to 0.2%, S: 0.001% to 0.35%, N: 0.002% to 0.035%, Al: 0.05% to 1.0%, and the balance consisting of Fe and inevitable impurities in which O is limited to 0.003% or less, and the amount of Al [Al %] and the amount of N [N %] satisfy [Al %]−(27/14)×[N %]≥0.05.

5 Claims, 1 Drawing Sheet

(56) References Cited

U.S. PATENT DOCUMENTS

| | | | | |
|---|---|---|---|---|
| 4,919,232 | A | * | 4/1990 | Lofton ............... 184/6.26 |
| 5,006,021 | A | * | 4/1991 | Wheetley ............ 408/1 R |
| 6,050,756 | A | * | 4/2000 | Buchholz et al. ..... 409/131 |
| 6,059,296 | A | * | 5/2000 | Baeder ................ 279/20 |
| 6,808,342 | B2 | * | 10/2004 | Kress et al. .......... 409/136 |
| 7,214,012 | B2 | * | 5/2007 | Sugata et al. ......... 409/136 |
| 7,754,029 | B2 | * | 7/2010 | Kubota et al. ........ 148/320 |
| 8,097,096 | B2 | * | 1/2012 | Yoshida et al. ....... 148/320 |
| 2004/0166768 | A1 | | 8/2004 | Usuki |
| 2007/0017609 | A1 | * | 1/2007 | Kubota et al. ........ 148/654 |
| 2010/0047107 | A1 | * | 2/2010 | Yoshida et al. ....... 420/83 |
| 2010/0272529 | A1 | * | 10/2010 | Rozzi et al. .......... 408/56 |

FOREIGN PATENT DOCUMENTS

| | | | |
|---|---|---|---|
| JP | 2000-308946 A | | 11/2000 |
| JP | 2001/29839 A | | 2/2001 |
| JP | 2002-126973 A | | 5/2002 |
| JP | 2004-150451 A | | 5/2004 |
| JP | 2004-276228 A | | 10/2004 |
| JP | 2005-271170 A | | 10/2005 |
| JP | 2006-83448 A | | 3/2006 |
| JP | 2008-13788 A | | 1/2008 |
| JP | 2008-110430 A | | 5/2008 |
| WO | WO 2008/130054 A1 | | 10/2008 |
| WO | WO 2010/070958 A1 | * | 6/2010 |
| WO | WO 2010082481 A1 | * | 7/2010 |
| WO | WO 2010082685 A1 | * | 7/2010 |
| WO | WO 2010116670 A1 | * | 10/2010 |
| WO | WO 2010/134583 A1 | | 11/2010 |

OTHER PUBLICATIONS

Extended European Search Report for corresponding Application No. 11762473.4 dated Feb. 22, 2013.

Decision of Rejection mailed Dec. 20, 2011 issued in Japanese Patent Application No. 2011-526321 (English translation attached).

PCT/ISA/210—International Search Report dated Apr. 12, 2011 issued for PCT/JP2011/054932.

Toshiaki Wakabayashi: "The Role of Tribology in Environmentally Friendly Machining", Tribologist, vol. 53, No. 1, (2008), pp. 4-9.

* cited by examiner

CUTTING METHOD OF STEEL FOR MACHINE STRUCTURAL USE

FIELD OF THE INVENTION

The present invention relates to a cutting method of steel for machine structural use.

Priority is claimed on Japanese Patent Application No. 2010-78231, filed Mar. 30, 2010, the content of which is incorporated herein by reference.

DESCRIPTION OF RELATED ART

Due to global environmental issues in recent years, it has become essential to increase the environment consciousness, for example, energy saving, resource saving, reduction of environmentally hazardous substances, or the like, when industrial products are manufactured. Most of the major parts of vehicles manufactured from a steel for machine structural use, for example, gears, continuously variable transmission (CVT), crankshafts, connecting rods, constant velocity joints (CVJ), or the like, are manufactured by performing cutting on the steel for machine structural use. Therefore, even in the field of cutting of steel for machine structural use, it is necessary to study environment-conscious technologies from the standpoint of cutting technologies or steel for machine structural use as a work material to be cut.

In cutting technology of steel for machine structural use, it is particularly necessary to reduce the amount of cutting fluids. A cutting fluid plays the roles of lubricating between a tool and a work material, cooling during cutting, removal of chips, or the like, thereby significantly improving the cutting efficiency, and therefore, thus far, a relatively large amount of cutting fluid has been used during cutting. However, for the purpose of improving production environment and minimizing waste, there is demand for a cutting technology that can obtain high efficiency even when the amount of a cutting fluid is extremely reduced.

Meanwhile, with regard to steel for machine structural use, it is necessary to increase the machinability of a steel, that is, the level of ease with which a steel can be cut, in order to increase the cutting efficiency. In the conventional techniques, S or Pb was added to steel to improve the machinability of steel for machine structural use. However, when the amount of S added increases, there is a problem in that mechanical properties deteriorate. Meanwhile, since Pb improves machinability without deteriorating mechanical properties, Pb has been approved particularly for improvement in the machinability of steel for machine structural use. However, there is a problem in that Pb is an environmentally hazardous substance. Therefore, there is demand for a technology that can improve machinability without using S and Pb.

With the above background, with regard to technologies for cutting steel for machine structural use, for example, Non-Patent Citation 1 discloses ongoing studies regarding a technology called 'Minimal Quantity Lubricants (MQL) cutting' in which use of a cutting fluid is extremely reduced. The MQL cutting is a method in which an extremely small amount of a cutting fluid is made to take the form of mist by a large amount of carrier gas, and cutting is performed while the cutting fluid mist is blown on the cutting edge of a tool or the surface of a work material. Through the technology, the amount of cutting fluid used can be significantly reduced.

In addition, with regard to steel for machine structural use, studies are underway regarding steels with new chemical compositions or microstructures. For example, Patent Citation 1 discloses steel for machine structural use for which the added amounts of Al and other nitride-forming elements and the added amount of N are controlled, and also appropriate heat treatments are performed. In the steel for machine structural use, solute N in steel, which is harmful to machinability, is suppressed to be low, and thus appropriate amounts of solute Al, which improves machinability through high-temperature embrittlement, and AlN, which improves machinability through high-temperature embrittlement and cleavable crystal structures, are secured. Therefore, the steel for machine structural use has excellent machinability across a wide cutting speed range from a low speed to a high speed and has both high impact value and yield ratio. Furthermore, Patent Citation 2 discloses a steel for cutting in which a small amount of a lubricant oil is used, that is, a steel for MQL cutting. The steel improves the service life of tools by specifying the added amount of elements, such as N, Ti, V or Mo, and the fraction of ferrite in a ferrite-pearlite microstructure, in order to lower the strength in the vicinity of 200° C. to 400° C. which has a relationship with cutting resistance during MQL cutting.

As such, as environment-responsive technologies for cutting, studies are underway regarding the MQL cutting or the chemical compositions of steels, and when carrying out future studies regarding environment-conscious technologies in the future, it is necessary to study both the methods for MQL cutting and the chemical compositions of steels.

Patent Citation

[Patent Citation 1] Japanese Unexamined Patent Application, First Publication No. 2008-13788

[Patent Citation 2] Japanese Unexamined Patent Application, First Publication No. 2006-83448

Non-Patent Citation

[Non-Patent Citation 1] "Role of Tribology in Environment-Responsive Cutting Technologies," "Tribologist", Vol. 53, No. 1 (2008), Pages 4 to 9

SUMMARY OF THE INVENTION

Problems to be Solved by the Invention

However, in the above conventional techniques, there are problems shown below.

Non-Patent Citation 1 describes methods for MQL cutting and the mechanism of the function of a cutting fluid, but only JISS45C steel is used as a steel (work material), and there is no detailed study regarding work materials. In particular, it is not always possible to apply the MQL to all cutting conditions (cutting fluid, tool, work material, machine tool, processing method)

In addition, Patent Citation 1 does not describe MQL cutting, and a steel for machine structural use is cut using conventional cutting methods, such as drilling or a turning operation.

Furthermore, Patent Citation 2 discloses steels for MQL, but does not disclose the detailed conditions of MQL cutting. Therefore, the techniques disclosed in Patent Citation 2 are not necessarily applicable to a wide range of cutting conditions.

In order to apply MQL cutting to a wide range of cutting conditions, it is necessary to study both the methods for MQL cutting and the chemical compositions of steels and to develop methods through which excellent machinability can be obtained even under Minimal Quantity Lubrication, but, currently, it does not seem that such a method has been proposed.

The present invention has been made in consideration of the above problems, and the object of the present invention is to provide a cutting method of steel for machine structural use which contributes to the excellent service life of a tool when MQL cutting is performed, that is, an extremely small amount of a cutting fluid is made to take the form of mist by a carrier gas, and cutting is performed while the cutting fluid mist is blown on the cutting edge of the tool or the surface of a work material.

Methods for Solving the Problem

The inventors carried out thorough studies to solve the above problems. Particularly, the inventors paid attention to the lubrication mechanism in the interface between a tool and a work material which is considered to have a large influence on the service life of the tool, and carried out a bibliographic survey and experiment.

Non-Patent Citation 1 describes that the following phenomena occur in the interface between a tool and a work material during MQL cutting.

(A) In the MQL cutting of JISS45C steel, the cutting resistance decreases as the concentration of oxygen in the carrier gas increases. This is because oxygen in the mist is adsorbed to newly-formed metal surfaces generated due to cutting and reacts so as to form an iron oxide film, and the iron oxide film acts as a solid lubricant with respect to friction by the low shear strength of the iron oxide.

(B) On the other hand, in the MQL cutting of an aluminum alloy, the behavior is opposite to that of JISS45C steel, and thus the cutting resistance increases as the concentration of oxygen in the carrier gas increases. This is because oxygen in the mist is adsorbed to newly-formed metal surfaces generated due to cutting and reacts so as to form high hardness alumina, and the alumina deteriorates friction properties by the high shear strength of the alumina.

As such, it has been considered that the generation of iron oxide in the interface between a tool and a work material is preferable in the improvement of machinability, but the generation of alumina is not preferable since alumina deteriorates friction properties. The inventors paid attention to the generation of an oxide in the interface between a tool and a work material, and repeated a variety of experiments, thereby obtaining the following findings.

(a) Using a SEM-EDS, an AES or a TEM-EDS, the inventors found that, when MQL cutting was performed on a steel including a large amount of a solute Al under a condition of an increased concentration of oxygen in the carrier gas, an oxide containing alumina as the main oxide was generated on the newly-formed surface of the steel and the tool. Since Al is an element having a larger binding force with oxygen than Fe, when MQL cutting is performed on a steel including a large amount of solute Al using a carrier gas having a high oxygen concentration, a chemical reaction occurs between the solute Al and the oxygen in the mist, and, even in the case of a steel, an oxide containing alumina as the main oxide is generated instead of iron oxide.

(b) As a result of a close observation of the cut surface of the steel using a SEM or the like, it was found that the oxide containing alumina as the main oxide, which was generated on the newly-formed surface of the steel, did not deteriorate friction properties since no trace or the like of severe adhesion was observed. The reasons can be considered as follows: For example, as described in "Shozaburo Nakano and Masayasu Ohtani: 'Works of Adhesion between Liquid Metals and Metallic Oxides', Journal of the Japan Institute of Metals, Vol. 34 (1970), Pages 562 to 567", the binding energy between alumina and a metal element increases as the free energy of oxide formation of the metal element decreases. Since Fe is an element having a larger free energy of oxide formation than Al, the binding energy when alumina is generated on the newly-formed surface of the steel is smaller than the binding energy when alumina is generated on the newly-formed surface of an aluminum alloy. Therefore, even when alumina is generated on the newly-formed surface of the steel, shear easily occurs from the interface between the steel and alumina, and thus alumina is not a resistance with respect to friction.

(c) Since alumina is hard, the oxide containing alumina as the main oxide, which is generated on a tool, acts as a tool protective film and thus provides wear resistance to the tool, thereby improving the service life of the tool.

(d) In order to stably generate alumina on a tool so as to improve the service life of the tool, it is necessary to optimize the amount of a cutting fluid, the ratio between the flow rate of a carrier gas and the amount of a cutting fluid, the ratio between the cross-sectional area of mist discharge opening and the supply pressure of a carrier gas, the number of mist ejections per second, and the temperature of a carrier gas.

As such, it was found that, by optimizing the chemical composition of the steel and the conditions of MQL cutting, it is possible to generate an oxide containing alumina as the main oxide on a newly-formed metal surface and a tool when a steel is cut, and thus to improve the service life of the tool through the formation of a tool protective film with the oxide. The present invention has been completed based on the above findings.

That is, the cutting method of steel for machine structural use according to the present invention is as follows:

(1) The cutting method of steel for machine structural use according to a first aspect of the present invention includes: forming a mist by mixing a cutting fluid supplied at a supply rate of 0.01 ml/hour to 200 ml/hour and an oxidizing gas containing, by volume %, 21% to 50% of oxygen; and cutting the steel for machine structural use while the mist is blown on the cutting edge surface of a tool and the surface of the steel for machine structural use, wherein the steel for machine structural use includes, by mass %: C: 0.01% to 1.2%, Si: 0.005% to 3.0%, Mn: 0.05% to 3.0%, P: 0.001% to 0.2%, S: 0.001% to 0.35%, N: 0.002% to 0.035%, Al: 0.05% to 1.0%, and the balance consisting of Fe and inevitable impurities in which 0 is limited to 0.003% or less, and the amount of Al [Al %] and the amount of N [N %] satisfy $[Al\%] - (27/14) \times [N\%] \geq 0.05$.

(2) In the cutting method of steel for machine structural use according to (1), the steel for machine structural use may further include, by mass %: at least one selected from the group consisting of Ca: 0.0001% to 0.02%, Ti: 0.0005% to 0.5%, Nb: 0.0005% to 0.5%, W: 0.0005% to 1.0%, V: 0.0005% to 1.0%, Ta: 0.0001% to 0.2%, Hf: 0.0001% to 0.2%, Mg: 0.0001% to 0.02%, Zr: 0.0001% to 0.02%, Rem: 0.0001% to 0.02%, Sb: 0.0001% to 0.015%, Sn: 0.0005% to 2.0%, Zn: 0.0005% to 0.5%, B: 0.0001% to 0.015%, Te: 0.0003% to 0.2%, Se: 0.0003% to 0.2%, Bi: 0.001% to 0.5%, Pb: 0.001% to 0.5%, Cr: 0.001% to 3.0%, Mo: 0.001% to 1.0%, Ni: 0.001% to 5.0%, Cu: 0.001% to 5.0%, Li: 0.00001% to 0.005%, Na: 0.00001% to 0.005%, K: 0.00001% to 0.005%, Ba: 0.00001% to 0.005%, and Sr: 0.00001% to 0.005%.

(3) In the cutting method of steel for machine structural use according to (1) or (2), when the flow rate of the oxidizing gas is defined as Q (l/minute), and the supply rate of the cutting fluid is defined as q (ml/hour), the ratio of q/Q may satisfy 0.001 to 1.

(4) In the cutting method of steel for machine structural use according to (1) or (2), when the cross-sectional area of an outlet through which the mist is ejected is defined as S (mm$^2$), and the supply pressure of the oxidizing gas is defined as P (MPa), the ratio of S/P may satisfy 0.2 to 40.

(5) In the cutting method of steel for machine structural use according to (1) or (2), the number of ejections per second of a delivery pump supplying the cutting fluid may be 0.05 to 16.

(6) In the cutting method of steel for machine structural use according to (1) or (2), the temperature of the oxidizing gas may be −80° C. to 40° C.

(7) In the cutting method of steel for machine structural use according to (1) or (2), the concentration of oxygen in the oxidizing gas may be 25% to 50%.

Effects of the Invention

According to the present invention, it is possible to provide a cutting method of steel for machine structural use which contribute to the excellent service life of a tool when MQL cutting is performed, that is, an extremely small amount of a cutting fluid is made to take the form of mist by a large amount of carrier gas, and cutting is performed while the cutting fluid mist is blown on the cutting edge of the tool or the surface of a work material.

DETAILED DESCRIPTION OF THE INVENTION

Figure 1A:
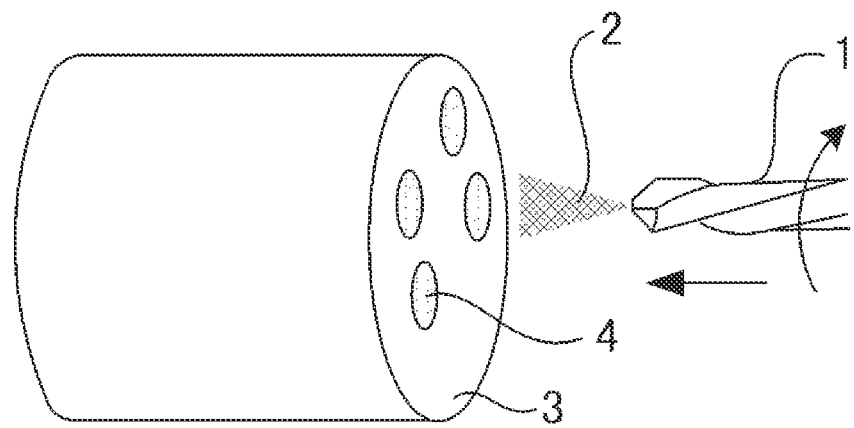
FIG. 1A is a perspective view explaining the outline of an evaluation test of the service life of a tool.

Hereinafter, the best embodiment to carry out the cutting method of steel for machine structural use of the present invention will be described.

Firstly, MQL cutting according to an embodiment of the present invention will be described.

A feature of the MQL cutting of the embodiment is to use an oxidizing gas as the carrier gas. The oxidizing gas in the embodiment has a concentration of oxygen in the gas of 21% or higher, and air is also included in the oxidizing gas. By performing MQL cutting on a steel containing a large amount of solute Al using an oxidizing gas as the carrier gas, it is possible to generate an oxide containing alumina as the main oxide on a tool, and to improve the service life of the tool through the formation of a tool protective film with the oxide. The concentration of oxygen in the gas can be measured using an oxygen meter. A gas having an oxygen concentration larger than 21% can be obtained by mixing oxygen into air or using an oxygen concentrator. When it is necessary to accelerate the generation of an oxide containing alumina as the main oxide on a tool and to further increase the service life of a tool, the oxygen concentration is preferably 25% or higher and more preferably 30% or higher. However, the oxygen concentration is preferably 50% or lower from the standpoint of safety issues. Meanwhile, the concentration of oxygen in the carrier gas is 'volume %'.

When the amount of cutting fluid in the mist exceeds 200 ml/hour, mist adhered to the tool hinders the generation of an oxide containing alumina as the main oxide on the tool, and thus it is difficult to improve the service life of the tool. On the other hand, when the amount of a cutting fluid is less than 0.01 ml/hour, it is difficult to obtain a lubrication action of the cutting fluid. Therefore, the amount of the cutting fluid (the supply rate) needs to be 0.01 ml/hour to 200 ml/hour. From the viewpoint of the service life of a tool and cutting efficiency, the amount of the cutting fluid is preferably 0.1 ml/hour to 150 ml/hour, and more preferably 1 ml/hour to 100 ml/hour.

It is desirable to vary the amount of the cutting fluid in accordance with the flow rate of the carrier gas. When the amount (ratio) of the cutting fluid in the carrier gas is too large, mist adhered to the tool hinders the generation of an oxide containing alumina as the main oxide on the tool, and thus it is difficult to improve the service life of the tool. On the other hand, when the amount (ratio) of the cutting fluid in the carrier gas is too small, it is difficult to obtain a lubrication action of the cutting fluid. Therefore, when the flow rate of the carrier gas is defined as Q (l/minute), and the amount of the cutting fluid is defined as q (ml/hour), q/Q, which is obtained by a division of q by Q, is preferably 0.001 to 1, more preferably 0.005 to 0.5, and further more preferably 0.01 to 0.2.

When the particle diameter of the mist supplied to the cutting edge of the tool is too large, the cutting fluid is excessively adhered to the tool, and thus hinders the generation of an oxide containing alumina as the main oxide on the tool. On the other hand, when the particle diameter of the mist is too small, mist is hardly adhered to the tool, and thus it is difficult to obtain a lubrication action of the cutting fluid. Therefore, it is desirable to optimize the particle diameter of the mist. The particle diameter of the mist varies according to the cross-sectional area of an outlet (the open end of a fluid hole), through which the mist is finally ejected, and the flow rate of the carrier gas, and the particle diameter of the mist becomes liable to be large as the cross-sectional area decreases and the flow rate increases. The flow rate of the carrier gas (the oxidizing gas) becomes faster as the supply pressure of the gas increases. Therefore, as a value of the cross-sectional area S (mm$^2$) divided by the supply pressure P (MPa), which is expressed as 'S/P (mm$^2$/MPa)', becomes smaller, the particle diameter of the mist becomes larger. When the S/P is 0.2 to 40, the particle diameter of the mist can be controlled in an appropriate range, and the service life of the tool is further improved. Therefore, when the cross-sectional area of an outlet, through which the mist is ejected, is defined as S (mm$^2$), and the supply pressure of the oxidizing gas is defined as P (MPa), the S/P, which is obtained by a division of S by P, is preferably 0.2 to 40, more preferably 0.25 to 25, and further more preferably 0.3 to 10. The cross-sectional area of the outlet, through which the mist is ejected, is the cross-sectional area of the fluid hole when the fluid is supplied along the spindle center through the fluid hole of a tool, such as a drill, and the cross-sectional area of the nozzle hole when the fluid is supplied through a nozzle. When there is a plurality of fluid holes or nozzle holes, the cross-sectional area is the total value of the cross-sectional areas of all the holes.

The cutting fluid is supplied using a delivery pump. When the frequency of the pump shots of the delivery pump (the number of ejections per 1 second) is too large, mist adhered to the tool hinders the generation of an oxide containing alumina as the main oxide on the tool, and thus it is difficult to improve the service life of the tool. On the other hand, when the frequency of the pump shots is too small, it is difficult to obtain a lubrication action of the cutting fluid. Therefore, the frequency of the pump shots N is preferably 0.05 Hz to 16 Hz (times), more preferably 0.1 Hz to 8 Hz, and further more preferably 0.5 Hz to 4 Hz.

In MQL cutting, generally, the cooling effect of a cutting fluid is small, and thus a large amount of heat is generated, and heat cracks occurs such that tool wear is liable to occur. Therefore, the service life of a tool can be increased by enhancing the cooling effect so as to prevent heat cracks. Therefore, it is desirable to enhance the cooling effect using a low-temperature carrier gas. When the temperature of a carrier gas is 40° C. or lower, the service life of a tool is further improved. Therefore, the temperature of the carrier gas (the oxidizing gas) is preferably 40° C. or lower, more preferably 20° C. or lower, and further more preferably 0° C. or lower. Considering the handling and manufacturing costs of a cooling gas, the temperature is preferably not too low, and therefore the temperature of the carrier gas may be −80° C. or higher. The cooling gas can be obtained using an air cooling system.

Mist is generated by supplying the cutting fluid and the oxidizing gas to a mist-generating apparatus. When mist is supplied along the spindle center through the fluid hole of a tool having a small diameter, since pressure loss becomes large inside the tool, there are cases in which the supply pressure of the oxidizing gas increases.

In MQL cutting, the chemical composition of a cutting fluid are not particularly limited. Meanwhile, when more care is given to environment, the cutting fluid is preferably a biodegradable lubricant oil. For example, it is possible to use a synthetic ester oil or a vegetable oil having high biodegradability as the cutting fluid.

In MQL cutting, when the cooling effect needs to be further enhanced, a cooling fluid, such as water, may be supplied in a mist form in addition to the oxidizing gas and the cutting fluid.

As a method for supplying mist, there is a plurality of methods, such as a method in which mist is sprayed to portions to be cut from a nozzle installed outside, a method in which the tool holder in a machine tool is equipped with a function of supplying MQL mist, and a method in which mist is supplied from the fluid hole at the cutting edge of a tool through a pipe line provided in the center of the main rotary spindle. With any of the above methods, it is possible to increase the service life of the tool.

The MQL cutting of the embodiment can be applied to both continuous cutting, such as a drilling, a turning operation, or a tapping, and interrupted cutting, such as a milling, an end milling, or a hobbing.

Next, the content of each of the chemical components of a steel for machine structural use (a work material) in the MQL cutting of the embodiment will be described. Here, in the steel for machine structural use (the work material), the balance of the chemical components described below has chemical components consisting of Fe and inevitable impurities. Meanwhile, in the description below, the 'mass %' in the chemical composition will be expressed simply as '%'.

C: 0.01% to 1.2%

C is an element having a large influence on the basic strength of a steel. However, when the amount of C is less than 0.01%, sufficient strength cannot be obtained. On the other hand, when the amount of C exceeds 1.2%, a number of hard carbides are precipitated, and therefore machinability is significantly degraded. Therefore, in order to obtain sufficient strength and machinability, the amount of C in a work material is from 0.01% to 1.2%, is preferably from 0.05% to 0.8%, and is more preferably from 0.10% to 0.70%.

Si: 0.005% to 3.0%

Si is generally added to steel as a deoxidizing element to strengthen ferrite and provide resistance to softening during tempering. However, when the amount of Si is less than 0.005%, a sufficient deoxidizing effect cannot be obtained. On the other hand, when the amount of Si exceeds 3.0%, toughness and ductility are lowered, and, at the same time, the hardness of a work material becomes large such that machinability is degraded. Therefore, the amount of Si in a work material is from 0.005% to 3.0%, is preferably from 0.01% to 2.5%, and is more preferably from 0.05% to 2.0%.

Mn: 0.05% to 3.0%

Mn is an element necessary to improve hardenability and secure strength after quenching by forming a solid solution in a matrix. Furthermore, Mn has an effect of improving machinability by combining with S in steel so as to generate MnS-based sulfides. However, when the amount of Mn is less than 0.05%, S in steel combines with Fe so as to generate FeS such that the steel becomes brittle. On the other hand, when the amount of Mn increases, specifically, when the amount of Mn exceeds 3.0%, the hardness of a work material becomes large such that workability and machinability are degraded. Therefore, the amount of Mn in a work material is from 0.05% to 3.0%, is preferably from 0.2% to 2.5%, and is more preferably from 0.35% to 2.0%.

P: 0.001% to 0.2%

P has an effect of improving machinability. However, when the amount of P is less than 0.001%, the effect cannot be obtained. In addition, when the amount of P increases, specifically, when the amount of P exceeds 0.2%, toughness is significantly degraded, and the hardness of a work material becomes large in steel such that not only cold workability but also hot workability and casting properties are degraded. Therefore, the amount of P in a work material is from 0.001% to 0.2%, is preferably from 0.005% to 0.1%, and is more preferably from 0.01% to 0.05%.

S: 0.001% to 0.35%

S combines with Mn so as to exist in steel as MnS-based sulfides. MnS has an effect of increasing machinability. In order to markedly obtain the effect, the amount of S needs to be 0.001% or more. On the other hand, when the amount of S exceeds 0.35%, the degradation of toughness and fatigue strength is significantly accelerated. Therefore, the amount of S in a work material is from 0.001% to 0.35%, is preferably from 0.005% to 0.15%, and is more preferably from 0.01% to 0.07%.

N: 0.002% to 0.035%

N has an effect of suppressing the coarsening of crystal grains by combining with Al, Ti, V, Nb, or the like so as to generate nitrides or carbonitrides. However, when the amount of N is less than 0.002%, the effect is not sufficient. In addition, when the amount of N exceeds 0.035%, the effect is saturated, and hot ductility is significantly degraded such that it becomes extremely difficult to manufacture a rolled steel. Therefore, the amount of N in a work material is from 0.002% to 0.035%, is preferably from 0.003% to 0.02%, and is more preferably from 0.0035% to 0.016%.

O: more than 0% to 0.003%

O is an impurity inevitably included. When the amount of O is excessive, a number of coarse oxide-based inclusions are generated in steel, and tool wear increases during cutting due to abrasive wear. In addition, in this case, there are cases in which the amount of the solute Al in steel, which will be described below, decreases. Therefore, it is desirable to reduce the amount of O as much as possible. As a result, it is necessary to control the amount of O to 0.003% or less, and the amount of O is preferably 0.0015% or less.

Al: 0.05% to 1.0%

Solute Al in steel: 0.05% to 1.0%

Al is the most important element in the present invention. As a deoxidizing element, Al improves the inner quality of steel. In addition, Al is an essential element to improve the service life of a tool when a work material is cut while mist including an oxidizing gas and a cutting fluid is blown on the cutting edge of a tool and the surface of the work material.

That is, when a solute Al in steel and oxygen in mist chemically react, a protective film of an oxide containing alumina as the main oxide is formed on a tool, thereby improving the service life of the tool. In order to sufficiently generate the solute Al that is effective for improving the service life of a tool, the amount of Al needs to be 0.05% or more. However, when the amount of Al exceeds 1.0%, a number of hard oxides having a high melting point are generated in steel and cause abrasive wear as hard inclusions such that tool wear increases during cutting. Therefore, the amount of Al is from 0.05% to 1.0%, is preferably from 0.08% to 0.5%, and is more preferably more than 0.1% and less than or equal to 0.26%.

Due to the above reasons, the amount of the solute Al needs to be 0.05% or more. When N is present in steel, AlN is generated, and therefore the solute Al decreases even when Al is included. That is, considering that the atomic weight of N is 14, and the atomic weight of Al is 27, for example, when 0.01% of N is added to steel, 0.02% of the solute Al, which is about twice the amount of N (27/14 times), is reduced, and therefore there are cases in which the service life of a tool is not sufficiently improved. Since the amount of the solute Al needs to be 0.05% or more, when a predetermined amount of N (for example, 0.002% or more) is present, it is necessary to add Al to steel in consideration of the amount of N. Therefore, the amount of Al [Al %] and the amount of N [N %] need to satisfy the following equation (1) by mass %, and it is preferable that the amount of Al [Al %] and the amount of N [N %] satisfy the following equation (2) by mass %.

$$[Al\%]-(27/14)\times[N\%]\geq 0.05 \quad (1)$$

$$[Al\%]-(27/14)\times[N\%]>0.1 \quad (2)$$

Meanwhile, the upper limit of the amount of the solute Al is 1.0%.

Also, in addition to the above chemical elements, the steel for machine structural use may include Ca in order to improve machinability.

Ca: 0.0001% to 0.02%

Ca is a deoxidizing element and improves the machinability of a work material by lowering the melting point of hard oxides, such as $Al_2O_3$, so as to soften the hard oxides, thereby suppressing tool wear. However, when the amount of Ca is less than 0.0001%, the effect of improving machinability cannot be obtained. In addition, when the amount of Ca exceeds 0.02%, CaS is generated in steel, and, conversely, machinability is degraded. Therefore, when Ca is added to steel, the amount of Ca is 0.0001% to 0.02%, is preferably from 0.0003% to 0.005%, and is more preferably from 0.0004% to 0.0020%.

Furthermore, when it is necessary to form carbonitrides so as to increase strength, the steel for machine structural use may include, in addition to the above chemical elements, one or more elements selected from a group consisting of Ti: 0.0005% to 0.5%, Nb: 0.0005% to 0.5%, W: 0.0005% to 1.0%, and V: 0.0005% to 1.0%.

Ti: 0.0005% to 0.5%

Ti is an element that forms carbonitrides and contributes to the suppression of the growth of austenite grains and the strengthening of steel. Therefore, Ti is used as an element that prevents coarse grains so as to uniformly control the size of crystal grains in a microstructure for steel requiring high strength and steel demanding low strain. In addition, Ti is also a deoxidizing element, and has an effect of improving machinability by forming soft oxides. However, when the amount of Ti is less than 0.0005%, the effect cannot be obtained. Also, when the amount of Ti exceeds 0.5%, coarse carbonitrides, which are not in the form of a solid solution and cause heat cracks, are precipitated, and, conversely, mechanical properties are impaired. Therefore, when Ti is added to steel, the amount of Ti is from 0.0005% to 0.5%, and is preferably from 0.01% to 0.3%.

Nb: 0.0005% to 0.5%

Nb is also an element that forms carbonitrides and contributes to strengthening of steel by secondary precipitation hardening and the suppression of the growth of austenite grains. Therefore, Nb is used as an element that prevents coarse grains so as to uniformly control the size of crystal grains in a microstructure for steel requiring high strength and steel demanding low strain. However, when the amount of Nb is less than 0.0005%, the effect of increasing strength cannot be obtained. In addition, when Nb is added to steel such that the amount of Nb exceeds 0.5%, coarse carbonitrides, which are not in the form of a solid solution and cause heat cracks, are precipitated, and, conversely, mechanical properties are impaired. Therefore, when Nb is added to steel, the amount of Nb is from 0.0005% to 0.5%, and is preferably from 0.005% to 0.2%.

W: 0.0005% to 1.0%

W is also an element that forms carbonitrides and can strengthen steel by secondary precipitation hardening. However, when the amount of W is less than 0.0005%, the effect of increasing strength cannot be obtained. In addition, when W is added to steel such that the amount of W exceeds 1.0%, coarse carbonitrides, which are not in the form of a solid solution and cause heat cracks, are precipitated, and, conversely, mechanical properties are impaired. Therefore, when W is added to steel, the amount of W is from 0.0005% to 1.0%, and is preferably from 0.01% to 0.8%.

V: 0.0005% to 1.0%

V is an element that forms carbonitrides and can strengthen steel by secondary precipitation hardening, and is appropriately added to steel requiring high strength. However, when the amount of V is less than 0.0005%, the effect of increasing strength cannot be obtained. In addition, when V is added to steel such that the amount of V exceeds 1.0%, coarse carbonitrides, which are not in the form of a solid solution and cause heat cracks, are precipitated, and, conversely, mechanical properties are impaired. Therefore, when V is added to steel, the amount of V is from 0.0005% to 1.0%, and is preferably from 0.01% to 0.8%.

Furthermore, when higher strength is required, the steel for machine structural use may include, in addition to the above chemical elements, one or more elements selected from a group consisting of Ta: 0.0001% to 0.2% and Hf: 0.0001% to 0.2%.

Ta: 0.0001% to 0.2%

Similarly to Nb, Ta is an element contributing to strengthening of steel by secondary precipitation hardening and the suppression of the growth of austenite grains. Therefore, Ta is used as an element that prevents coarse grains so as to uniformly control the size of crystal grains in a microstructure for steel requiring high strength and steel demanding low strain. However, when the amount of Ta is less than 0.0001%, the effect of increasing strength cannot be obtained. In addition, when Ta is added to steel such that the amount of Ta exceeds 0.2%, coarse carbonitrides, which are not in the form of a solid solution and cause heat cracks, are precipitated, and, conversely, mechanical properties are impaired. Therefore, when Ta is added to steel, the amount of Ta is from 0.0001% to 0.2%, and is preferably from 0.001% to 0.1%.

Hf: 0.0001% to 0.2%

Similarly to Ti, Hf is an element contributing to the suppression of the growth of austenite grains and strengthening of steel. Therefore, Hf is used as an element that prevents coarse grains so as to uniformly control the size of crystal grains in a microstructure for steel requiring high strength and steel demanding low strain. However, when the amount of Hf is less than 0.0001%, the effect of increasing strength cannot be obtained. In addition, when Hf is added to steel such that the amount of Hf exceeds 0.2%, conversely, mechanical properties are impaired due to coarse precipitates, which is not in the form of a solid solution and causes heat cracks. Therefore, when Hf is added to steel, the amount of Hf is from 0.0001% to 0.2%, and is preferably from 0.001% to 0.1%.

Furthermore, when the morphological control of sulfides is performed by deoxidizing control, the steel for machine structural use may include, in addition to the above chemical elements, one or more elements selected from a group consisting of Mg: 0.0001% to 0.02%, Zr: 0.0001% to 0.02%, and Rem: 0.0001% to 0.02%.

Mg: 0.0001% to 0.02%

Mg is a deoxidizing element and generates oxides in steel. When deoxidation by Al is assumed, $Al_2O_3$, which is harmful to machinability, is reformed to MgO or $Al_2O_3 \cdot MgO$, which is relatively soft and finely dispersed. In addition, the oxide is liable to act as a nucleus of MnS and also has an effect of finely dispersing MnS. However, when the amount of Mg is less than 0.0001%, the effect cannot be obtained. In addition, Mg generates complex sulfides with MnS so as to achieve spheroidizing of MnS, but when the Mg is excessively added to steel such that the amount of Mg exceeds 0.02%, the generation of sole MgS is accelerated so as to degrade machinability. Therefore, when Mg is added to steel, the amount of Mg is from 0.0001% to 0.02%, is preferably from 0.0003% to 0.0040%, and is more preferably from 0.0005% to 0.0030%.

Zr: 0.0001% to 0.02%

Zr is a deoxidizing element and generates oxides in steel. The oxide is considered to be $ZrO_2$; however, since the oxide acts as a precipitation nucleus of MnS, the oxide has effects of increasing sites for MnS to precipitate and uniformly dispersing MnS. In addition, Zr forms a solid solution in MnS so as to generate complex sulfides, and has an ability of suppressing the elongation of MnS during rolling and hot forging by degrading the deformability of MnS. As such, Zr is an effective element for the reduction of anisotropy. However, when the amount of Zr is less than 0.0001%, a remarkable effect cannot be obtained with regard to the above. On the other hand, when Zr is added to steel such that the amount of Zr exceeds 0.02%, not only does the yield become extremely bad, but also a number of hard compounds, such as $ZrO_2$ and ZrS, are generated, and, conversely, mechanical properties, such as machinability, impact value, and fatigue properties, are degraded. Therefore, when Zr is added to steel, the amount of Zr is from 0.0001% to 0.02%, is preferably from 0.0003% to 0.01%, and is more preferably from 0.0005% to 0.005%.

Rem: 0.0001% to 0.02%

Rem (Rare Earth Metals) are deoxidizing elements, generate oxides having a low melting point and suppress nozzle clogging during casting. Furthermore, Rem form a solid solution in MnS or combine with MnS, and have an ability of suppressing the elongation of MnS during rolling and hot forging by degrading the deformability of MnS. As such, Rem are effective elements for the reduction of anisotropy. However, when the total amount of Rem is less than 0.0001%, the effects are not considerable. In addition, when Rem are added to steel such that the amount of Rem exceeds 0.02%, a large amount of Rem sulfide is generated, and thus machinability is degraded. Therefore, when Rem is added to steel, the amount of Rem is from 0.0001% to 0.02%, is preferably from 0.0003% to 0.015%, and is more preferably from 0.0005% to 0.01%.

Furthermore, when machinability is further improved, the steel for machine structural use may include, in addition to the above chemical elements, one or more elements selected from a group consisting of Sb: 0.0001% to 0.015%, Sn: 0.0005% to 2.0%, Zn: 0.0005% to 0.5%, B: 0.0001% to 0.015%, Te: 0.0003% to 0.2%, Se: 0.0003% to 0.2%, Bi: 0.001% to 0.5%, and Pb: 0.001% to 0.5%.

Sb: 0.0001% to 0.015%

Sb makes ferrite appropriately brittle and improves machinability. The effect does not develop when the amount of Sb is less than 0.0001%. In addition, when the amount of Sb increases, specifically, when the amount of Sb exceeds 0.015%, the macro segregation of excessive Sb occurs such that the impact value significantly decreases. Therefore, when Sb is added to steel, the amount of Sb is from 0.0001% to 0.015%, is preferably from 0.0005% to 0.012%, and is more preferably from 0.001% to 0.01%.

Sn: 0.0005% to 2.0%

Sn has effects of making ferrite brittle so as to extend the service life of a tool and improving the roughness of surfaces. However, when the amount of Sn is less than 0.0005%, the effect is not obtained. In addition, when Sn is added to steel such that the amount of Sn exceeds 2.0%, the effect is saturated. Therefore, when Sn is added to steel, the amount of Sn is from 0.0005% to 2.0%, is preferably from 0.001% to 1.0%, and is more preferably from 0.01% to 0.2%.

Zn: 0.0005% to 0.5%

Zn has effects of making ferrite brittle so as to extend the service life of a tool and improving the roughness of surfaces. However, when the amount of Zn is less than 0.0005%, the effect is not obtained. In addition, when Zn is added to steel such that the amount of Zn exceeds 0.5%, the effect is saturated. Therefore, when Zn is added to steel, the amount of Zn is from 0.0005% to 0.5%, is preferably from 0.001% to 0.3%, and is more preferably from 0.01% to 0.1%.

B: 0.0001% to 0.015%

B is effective for grain boundary strengthening and hardenability when B forms a solid solution in steel, and has an effect of improving machinability when B is precipitated in the form of BN. These effects are not significant when the amount of B is less than 0.0001%. On the other hand, when B is added to steel such that the amount of B exceeds 0.015%, the effects are saturated, and BN is precipitated too much, and therefore the mechanical properties of steel are impaired. Therefore, when B is added to steel, the amount of B is from 0.0001% to 0.015%, is preferably from 0.0005% to 0.01%, and is more preferably from 0.001% to 0.003%.

Te: 0.0003% to 0.2%

Te is an element that improves machinability. In addition, Te has an ability of generating MnTe or coexisting with MnS so as to degrade the deformability of MnS and thus suppress the elongation of MnS. As such, Te is an effective element for the reduction of anisotropy. However, when the amount of Te is less than 0.0003%, these effects are not obtained. In addition, when the amount of Te exceeds 0.2%, not only are the effects are saturated, but also hot ductility is degraded such that flaws are liable to occur. Therefore, when Te is added to steel, the amount of Te is from 0.0003% to 0.2%, is preferably from 0.0005% to 0.1%, and is more preferably from 0.001% to 0.01%.

Se: 0.0003% to 0.2%

Se is an element that improves machinability. In addition, Se has an ability of generating MnSe or coexisting with MnS so as to degrade the deformability of MnS and thus suppress the elongation of MnS. As such, Se is an effective element for the reduction of anisotropy. However, when the amount of Se is less than 0.0003%, these effects are not obtained. In addition, when the amount of Se exceeds 0.2%, the effects are saturated. Therefore, when Se is added to steel, the amount of Se is from 0.0003% to 0.2%, is preferably from 0.0005% to 0.1%, and is more preferably from 0.001% to 0.01%.

Bi: 0.001% to 0.5%

Bi is an element that improves machinability. However, when the amount of Bi is less than 0.001%, the effect is not obtained. In addition, when Bi is added to steel such that the amount of Bi exceeds 0.5%, not only the effect of improving machinability is saturated, but also hot ductility is degraded such that flaws are liable to occur. Therefore, when Bi is added to steel, the amount of Bi is from 0.001% to 0.5%, is preferably from 0.01% to 0.3%, and is more preferably from 0.04% to 0.25%.

Pb: 0.001% to 0.5%

Pb is an element that improves machinability. However, when the amount of Pb is less than 0.001%, the effect is not obtained. In addition, when Pb is added to steel such that the amount of Pb exceeds 0.5%, not only is the effect of improving machinability saturated, but also hot ductility is degraded such that flaws are liable to occur. Therefore, when Pb is added to steel, the amount of Pb is from 0.001% to 0.5%, is preferably from 0.01% to 0.3%, and is more preferably from 0.04% to 0.25%.

Furthermore, when hardenability and resistance to softening during tempering are improved to provide strength to a steel, the steel for machine structural use may include, in addition to the above chemical elements, one or more elements selected from a group consisting of Cr: 0.001% to 3.0%, and Mo: 0.001% to 1.0%.

Cr: 0.001% to 3.0%

Cr is an element that improves hardenability and also provides resistance to softening during tempering to steel, and is added to steel requiring high strength. However, when the amount of Cr is less than 0.001%, these effects are not obtained. In addition, when a large amount of Cr is added to steel, specifically, when the amount of Cr exceeds 3.0%, carbides of Cr are generated so as to make steel brittle. Therefore, when Cr is added to steel, the amount of Cr is from 0.001% to 3.0%, is preferably from 0.01% to 2.3%, and is more preferably from 0.1% to 1.8%.

Mo: 0.001% to 1.0%.

Mo is an element that provides resistance to softening during tempering to steel and also improves hardenability, and is added to steel requiring high strength. However, when the amount of Mo is less than 0.001%, these effects are not obtained. In addition, when Mo is added to steel such that the amount of Mo exceeds 1.0%, the effects are saturated. Therefore, when Mo is added to steel, the amount of Mo is from 0.001% to 1.0%, is preferably from 0.01% to 0.8%, and is more preferably from 0.05% to 0.5%.

Furthermore, when ferrite is strengthened, the steel for machine structural use may include, in addition to the above chemical elements, one or more elements selected from a group consisting of Ni: 0.001% to 5.0% and Cu: 0.001% to 5.0%.

Ni: 0.001% to 5.0%

Ni is an element that strengthens ferrite, improves ductility, and improves hardenability and corrosion resistance. However, when the amount of Ni is less than 0.001%, these effects are not obtained. In addition, when Ni is added to steel such that the amount of Ni exceeds 5.0%, the effects are saturated from the standpoint of mechanical properties, and machinability is degraded. Therefore, when Ni is added to steel, the amount of Ni is from 0.001% to 5.0%, is preferably from 0.1% to 4.0%, and is more preferably from 0.3% to 3.0%.

Cu: 0.001% to 5.0%.

Cu is an element that strengthens ferrite, and improves hardenability and corrosion resistance. However, when the amount of Cu is less than 0.001%, these effects are not obtained. In addition, when Cu is added to steel such that the amount of Cu exceeds 5.0%, the effects are saturated from the standpoint of mechanical properties. Therefore, when Cu is added to steel, the amount of Cu is from 0.001% to 5.0%, is preferably from 0.01% to 4.0%, and is more preferably from 0.1% to 3.0%. Meanwhile, since Cu degrades particularly hot ductility and thus is highly likely to cause flaws during rolling, in this case, it is preferable to add Ni with Cu.

Furthermore, when machinability is further improved, the steel for machine structural use may include, in addition to the above chemical elements, one or more elements selected from a group consisting of Li: 0.00001% to 0.005%, Na: 0.00001% to 0.005%, K: 0.00001% to 0.005%, Ba: 0.00001% to 0.005%, and Sr: 0.00001% to 0.005%.

Li: 0.00001% to 0.005%

Li forms oxides having a low melting point in steel so as to suppress tool wear. However, when the amount of Li is less than 0.00001%, the effect is not obtained. In addition, when Li is added to steel such that the amount of Li exceeds 0.005%, not only is the effect saturated, but there are cases in which corrosion of refractory is caused. Therefore, when Li is added to steel, the amount of Li is from 0.00001% to 0.005%, and is preferably from 0.0001% to 0.0045%.

Na: 0.00001% to 0.005%

Similarly to Li, Na also forms oxides having a low melting point in steel so as to suppress tool wear. However, when the amount of Na is less than 0.00001%, the effect is not obtained. In addition, when Na is added to steel such that the amount of Na exceeds 0.005%, not only is the effect saturated, but there are cases in which corrosion of refractory is caused. Therefore, when Na is added to steel, the amount of Na is from 0.00001% to 0.005%, and is preferably from 0.0001% to 0.0045%.

K: 0.00001% to 0.005%

Similarly to Li, K also forms oxides having a low melting point in steel so as to suppress tool wear. However, when the amount of K is less than 0.00001%, the effect is not obtained. In addition, when K is added to steel such that the amount of K exceeds 0.005%, not only is the effect saturated, but there are cases in which corrosion of refractory is caused. Therefore, when K is added to steel, the amount of K is from 0.00001% to 0.005%, and is preferably from 0.0001% to 0.0045%.

Ba: 0.00001% to 0.005%

Similarly to Li, Ba also forms oxides having a low melting point in steel so as to suppress tool wear. However, when the amount of Ba is less than 0.00001%, the effect is not obtained. In addition, when Ba is added to steel such that the amount of Ba exceeds 0.005%, not only is the effect saturated, but there are cases in which corrosion of refractory is caused. Therefore, when Ba is added to steel, the amount of Ba is from 0.00001% to 0.005%, and is preferably from 0.0001% to 0.0045%.

Sr: 0.00001% to 0.005%

Similarly to Li, Sr also forms oxides having a low melting point in steel so as to suppress tool wear. However, when the amount of Sr is less than 0.00001%, the effect is not obtained. In addition, when Sr is added to steel such that the amount of Sr exceeds 0.005%, not only is the effect saturated, but there are cases in which corrosion of refractory is caused. Therefore, when Sr is added to steel, the amount of Sr is from 0.00001% to 0.005%, and is preferably from 0.0001% to 0.0045%.

As described above, in the cutting method of steel for machine structural use according to the present invention, by performing MQL cutting in which an extremely small amount of a cutting fluid is made to take the form of mist by a large amount of carrier gas, and cutting is performed while the cutting fluid mist is blown on the cutting edge of a tool or the surface of a work material, a solute Al in steel and oxygen in the mist chemically react so as to form a protective film of an oxide containing alumina as the main oxide on the tool, and therefore it is possible to obtain an excellent service life of the tool.

EXAMPLES

Next, the effects of the present invention will be described in detail using examples.

In the examples, 150 kg of steels having the chemical compositions shown in Tables 1 to 5 were melted in a vacuum melting furnace, and then the obtained steels were cogged into a cylindrical shape having a diameter of 50 mm by performing hot forging under a temperature condition of 1250° C. After that, the steels were subjected to a homogenization treatment in which the steels were heated at 1300° C. for 2 hours and then were cooled in air and then a heat treatment in which the steels were heated at 1200° C. for 1 hour and then were cooled in air. After that, specimens for the evaluation tests of the service life of tools having a diameter of 48 mm and a length of 105 mm were cut out from the obtained steels, and the specimens were used for the tests (Test Nos. A1 to E12).

TABLE 1

| Test No. | Chemical Elements in Steel (mass %) | | | | | | | | [Al %]-27/14[N %] |
|---|---|---|---|---|---|---|---|---|---|
| | C | Si | Mn | P | S | Al | N | O | |
| A1 | 0.42 | 0.57 | 1.35 | 0.015 | 0.022 | 0.134 | 0.0045 | 0.0010 | 0.125 |
| A2 | 0.40 | 0.63 | 1.23 | 0.014 | 0.018 | 0.114 | 0.0050 | 0.0029 | 0.104 |
| A3 | 0.56 | 0.27 | 0.82 | 0.015 | 0.016 | 0.176 | 0.0120 | 0.0008 | 0.153 |
| A4 | 0.48 | 0.53 | 1.33 | 0.015 | 0.050 | 0.131 | 0.0044 | 0.0016 | 0.123 |
| A5 | 0.50 | 0.55 | 1.28 | 0.010 | 0.063 | 0.139 | 0.0050 | 0.0018 | 0.129 |
| A6 | 1.10 | 0.17 | 0.41 | 0.022 | 0.060 | 0.189 | 0.0040 | 0.0015 | 0.181 |
| A7 | 0.46 | 0.78 | 0.75 | 0.016 | 0.047 | 0.114 | 0.0041 | 0.0010 | 0.106 |
| A8 | 0.48 | 0.70 | 0.73 | 0.018 | 0.051 | 0.113 | 0.0049 | 0.0011 | 0.104 |
| A9 | 0.46 | 0.60 | 1.23 | 0.016 | 0.040 | 0.126 | 0.0050 | 0.0013 | 0.116 |
| A10 | 0.50 | 0.59 | 1.32 | 0.017 | 0.046 | 0.130 | 0.0045 | 0.0019 | 0.121 |
| A11 | 0.48 | 0.63 | 1.37 | 0.011 | 0.050 | 0.132 | 0.0049 | 0.0010 | 0.123 |
| A12 | 0.55 | 0.34 | 1.03 | 0.013 | 0.044 | <u>0.045</u> | 0.0048 | 0.0014 | <u>0.036</u> |
| A13 | 0.47 | 0.61 | 1.36 | 0.013 | 0.051 | <u>0.035</u> | 0.0050 | 0.0009 | <u>0.025</u> |
| B1 | 0.68 | 0.20 | 0.76 | 0.014 | 0.014 | 0.120 | 0.0051 | 0.0022 | 0.110 |
| B2 | 0.38 | 1.08 | 0.87 | 0.010 | 0.051 | 0.112 | 0.0049 | 0.0011 | 0.103 |
| B3 | 0.51 | 0.29 | 0.90 | 0.012 | 0.029 | 0.069 | 0.0040 | 0.0010 | 0.061 |
| B4 | 0.39 | 0.58 | 1.52 | 0.013 | 0.020 | 0.111 | 0.0037 | 0.0015 | 0.104 |
| B5 | 0.39 | 0.61 | 1.48 | 0.017 | 0.019 | 0.111 | 0.0041 | 0.0014 | 0.103 |
| B6 | 0.52 | 0.27 | 0.85 | 0.015 | 0.029 | 0.124 | 0.0045 | 0.0010 | 0.115 |
| B7 | 0.50 | 0.53 | 1.20 | 0.010 | 0.048 | 0.089 | 0.0046 | 0.0008 | 0.080 |
| B8 | 0.45 | 0.52 | 1.33 | 0.013 | 0.031 | 0.154 | 0.0044 | 0.0003 | 0.146 |
| B9 | 0.48 | 0.49 | 1.47 | 0.012 | 0.065 | 0.162 | 0.0040 | 0.0021 | 0.154 |
| B10 | 0.47 | 0.56 | 1.24 | 0.016 | 0.040 | <u>0.030</u> | 0.0042 | 0.0013 | <u>0.022</u> |
| B11 | 0.35 | 0.57 | 1.49 | 0.013 | 0.048 | <u>0.071</u> | 0.0122 | 0.0014 | <u>0.047</u> |
| B12 | 0.47 | 0.66 | 1.40 | 0.015 | 0.067 | <u>1.201</u> | 0.0065 | 0.0009 | 1.188 |
| B13 | 0.47 | 0.46 | 1.48 | 0.015 | 0.063 | 0.164 | 0.0039 | 0.0020 | 0.156 |
| C1 | 0.44 | 0.61 | 1.39 | 0.014 | 0.042 | 0.476 | 0.0049 | 0.0015 | 0.467 |
| C2 | 0.58 | 1.56 | 0.70 | 0.001 | 0.034 | 0.255 | 0.0080 | 0.0003 | 0.240 |
| C3 | 0.45 | 0.83 | 1.30 | 0.015 | 0.040 | 0.133 | 0.0079 | 0.0013 | 0.118 |
| C4 | 0.41 | 0.50 | 1.68 | 0.014 | 0.041 | 0.145 | 0.0040 | 0.0008 | 0.137 |
| C5 | 0.40 | 0.53 | 1.72 | 0.015 | 0.045 | 0.149 | 0.0043 | 0.0010 | 0.141 |
| C6 | 0.41 | 0.65 | 1.22 | 0.015 | 0.042 | 0.187 | 0.0157 | 0.0021 | 0.157 |
| C7 | 0.40 | 0.06 | 1.98 | 0.015 | 0.023 | 0.194 | 0.0120 | 0.0012 | 0.171 |
| C8 | 0.45 | 0.58 | 1.36 | 0.015 | 0.041 | 0.169 | 0.0052 | 0.0014 | 0.159 |
| C9 | 0.41 | 0.62 | 1.37 | 0.014 | 0.051 | 0.111 | 0.0039 | 0.0013 | 0.103 |
| C10 | <u>1.37</u> | 0.61 | 0.87 | 0.011 | 0.053 | 0.123 | 0.0043 | 0.0011 | 0.115 |
| C11 | 0.45 | <u>3.11</u> | 1.45 | 0.014 | 0.031 | 0.119 | 0.0046 | 0.0010 | 0.110 |
| C12 | 0.42 | 0.53 | <u>3.06</u> | 0.015 | 0.029 | 0.137 | 0.0056 | 0.0015 | 0.126 |
| C13 | 0.40 | 0.61 | 1.36 | 0.015 | 0.050 | <u>1.260</u> | 0.0037 | 0.0012 | 1.253 |

*Other chemical elements are shown in Table 2.
*Any of Sb, Sn, Zn, B, Te, Se, Bi, Pb, Li, Na, K, Ba, and Sr are not added in steel as other elements in Tests No. A1 to C12.
*The underlined values in this table indicate that those values fail to satisfy the conditions of the present invention.

TABLE 2

| Test No. | Chemical Elements in Steel (mass %) | | | | | | | | | | | | |
|---|---|---|---|---|---|---|---|---|---|---|---|---|---|
| | Ca | Ti | Nb | W | V | Ta | Hf | Cr | Mo | Ni | Cu | Mg | Zr | Rem |
| A1 | 0.0031 | | 0.008 | | | | | | | | | | | |
| A2 | 0.0015 | | | 0.04 | | | | | | | | | | |
| A3 | | | | | | | | | | | | | | |
| A4 | | | | | | | | | | | | | | |
| A5 | | | | | | | | | | | | | | |
| A6 | | 0.20 | | | | | | | | | | | | |
| A7 | | | | | | | | | | | | | | |
| A8 | | | | | | | | | | | | | | |
| A9 | | | | | | | | | | | | | | |
| A10 | | | | | | | | | | | | | | |

TABLE 2-continued

| Test No. | Ca | Ti | Nb | W | V | Ta | Hf | Cr | Mo | Ni | Cu | Mg | Zr | Rem |
|---|---|---|---|---|---|---|---|---|---|---|---|---|---|---|
| A11 | | | | | | | | | | | | | | |
| A12 | | | | | | | | | | | | | | |
| A13 | | | | | | | | | | | | | | |
| B1 | | | | | 0.44 | | | | | | | | | |
| B2 | 0.0004 | 0.08 | | | | | | 1.20 | 0.28 | 0.49 | 0.28 | | | |
| B3 | | | | | | | | | | | | | | |
| B4 | | | | | | | | | | | | | | |
| B5 | | | | | | | | | | | | | | |
| B6 | | | | | | | | | | | | | | |
| B7 | | 0.02 | 0.140 | | 0.20 | 0.001 | 0.005 | 0.18 | | | | | | |
| B8 | | | | | | | | | | | | | | |
| B9 | | | | | | | | | | | | | | |
| B10 | | | | | | | | | | | | | | |
| B11 | | | | | | | | | | | | | | |
| B12 | | | | | | | | | | | | | | |
| B13 | | | | | | | | | | | | | | |
| C1 | | | | | | | | | | | | | | |
| C2 | 0.0006 | | 0.030 | 0.28 | 0.05 | | | 2.30 | 0.80 | 0.63 | | 0.0006 | 0.0050 | |
| C3 | 0.0012 | 0.11 | 0.030 | | | 0.080 | | 0.90 | | 2.30 | 1.20 | | | |
| C4 | | | | | | | | | | | | | | |
| C5 | | | | | | | | | | | | | | |
| C6 | | | | | | | | | | | | | | 0.0010 |
| C7 | 0.0012 | | | | | | | | | | | | 0.0012 | |
| C8 | | | | | | | | | | | | | | |
| C9 | | | | | | | | | | | | | | |
| C10 | | | | | | | | | | | | | | |
| C11 | | | | | | | | | | | | | | |
| C12 | | | | | | | | | | | | | | |
| C13 | | | | | | | | | | | | | | |

TABLE 3

| Test No. | C | Si | Mn | P | S | Al | N | O | [Al %]-27/14[N %] |
|---|---|---|---|---|---|---|---|---|---|
| D1 | 0.55 | 0.42 | 0.95 | 0.012 | 0.026 | 0.111 | 0.0047 | 0.0010 | 0.102 |
| D2 | 0.43 | 0.67 | 1.43 | 0.013 | 0.049 | 0.123 | 0.0048 | 0.0009 | 0.114 |
| D3 | 0.42 | 0.70 | 1.46 | 0.013 | 0.052 | 0.120 | 0.0044 | 0.0014 | 0.112 |
| D4 | 0.50 | 1.98 | 0.58 | 0.016 | 0.036 | 0.170 | 0.0089 | 0.0021 | 0.153 |
| D5 | 0.56 | 0.40 | 0.90 | 0.013 | 0.028 | 0.109 | 0.0043 | 0.0010 | 0.101 |
| D6 | 0.10 | 1.02 | 1.24 | 0.016 | 0.067 | 0.221 | 0.0090 | 0.0013 | 0.204 |
| D7 | 0.38 | 0.33 | 1.85 | 0.013 | 0.025 | 0.187 | 0.0112 | 0.0011 | 0.165 |
| D8 | 0.49 | 0.39 | 1.29 | 0.018 | 0.045 | 0.128 | 0.0052 | 0.0008 | 0.118 |
| D9 | 0.41 | 0.58 | 1.26 | 0.015 | 0.018 | 0.143 | 0.0048 | 0.0015 | 0.134 |
| D10 | 0.47 | 0.62 | 1.37 | 0.014 | 0.047 | 0.145 | 0.0052 | 0.0010 | 0.135 |
| D11 | 0.55 | 0.30 | 1.02 | 0.015 | 0.030 | 0.130 | 0.0050 | <u>0.0038</u> | 0.120 |
| D12 | 0.64 | 0.26 | 1.36 | 0.012 | 0.023 | 0.201 | 0.0044 | 0.0008 | 0.193 |
| D13 | 0.48 | 0.40 | 1.26 | 0.020 | 0.047 | 0.131 | 0.0048 | 0.0009 | 0.122 |
| E1 | 0.60 | 0.33 | 0.83 | 0.003 | 0.020 | 0.680 | 0.0090 | 0.0016 | 0.663 |
| E2 | 0.45 | 0.64 | 1.45 | 0.011 | 0.028 | 0.203 | 0.0051 | 0.0013 | 0.193 |
| E3 | 0.46 | 0.54 | 1.49 | 0.018 | 0.043 | 0.119 | 0.0047 | 0.0008 | 0.110 |
| E4 | 0.42 | 0.50 | 1.56 | 0.013 | 0.045 | 0.115 | 0.0042 | 0.0005 | 0.107 |
| E5 | 0.39 | 0.49 | 1.68 | 0.012 | 0.046 | 0.960 | 0.0042 | 0.0009 | 0.952 |
| E6 | 0.62 | 0.63 | 0.36 | 0.011 | 0.018 | 0.153 | 0.0041 | 0.0006 | 0.145 |
| E7 | 0.45 | 0.26 | 0.81 | 0.014 | 0.002 | 0.810 | 0.0110 | 0.0011 | 0.789 |
| E8 | 0.56 | 0.80 | 0.39 | 0.015 | 0.018 | 0.342 | 0.0131 | 0.0014 | 0.317 |
| E9 | 0.52 | 0.89 | 0.89 | 0.020 | 0.037 | 0.173 | 0.0063 | 0.0013 | 0.161 |
| E10 | 0.42 | 0.71 | 1.10 | 0.014 | 0.016 | 0.152 | 0.0037 | 0.0010 | 0.145 |
| E11 | 0.44 | 0.60 | 1.32 | 0.016 | 0.030 | 0.127 | 0.0040 | 0.0015 | 0.119 |
| E12 | 0.40 | 0.58 | 1.28 | 0.015 | 0.033 | 0.119 | 0.0046 | 0.0010 | 0.110 |

*Other chemical elements are shown in Tables 4 and 5.
*The underlined values in this table indicate that those values fail to satisfy the conditions of the present invention.

TABLE 4

| Test No. | Chemical Elements in Steel (mass %) | | | | | | | | | | | | | |
| --- | --- | --- | --- | --- | --- | --- | --- | --- | --- | --- | --- | --- | --- | --- |
| | Ca | Ti | Nb | W | V | Ta | Hf | Cr | Mo | Ni | Cu | Mg | Zr | Rem |
| D1 | | | | | | | | | | | | | | |
| D2 | | | | | | | | | | | | | | |
| D3 | | | | | | | | | | | | | | |
| D4 | 0.0004 | | 0.020 | | 0.22 | | 0.030 | | | | | 0.0019 | | 0.0070 |
| D5 | | | | | | | | | | | | | | |
| D6 | | 0.03 | | | | | | | | | | | | |
| D7 | | | | | | | | | | | | 0.0030 | | |
| D8 | | | | | | | | | | | | | | |
| D9 | | | | | | | | | | | | | | |
| D10 | | | | | | | | | | | | | | |
| D11 | | | | | | | | | | | | | | |
| D12 | 0.0240 | | | | | | | | | | | | | |
| D13 | | | | | | | | | | | | | | |
| E1 | | | 0.04 | | | | | | | | | | | |
| E2 | | | 0.030 | | | | | | | | | 0.0010 | | 0.0003 |
| E3 | | | | | | | | | | | | | | |
| E4 | | | | | | | | | | | | | | |
| E5 | 0.0013 | | | | | | | | | | | | | |
| E6 | | | | | | | | 1.10 | 0.10 | | | | | |
| E7 | | | | | | | | | | | | 0.0009 | 0.0020 | 0.0036 |
| E8 | 0.0011 | | | | | 0.60 | | | | | | | 0.0010 | |
| E9 | | | | | | | | | | | | | | |
| E10 | | | | | | | | | | | | | | |
| E11 | | | | | | | | | | | | | | 0.0253 |
| E12 | | | | | | | | | | 5.3 | | | | |

*The underlined values in this table indicate that those values fail to satisfy the conditions of the present invention.

TABLE 5

| Test No. | Chemical Elements in Steel (mass %) | | | | | | | | | | | | |
| --- | --- | --- | --- | --- | --- | --- | --- | --- | --- | --- | --- | --- | --- |
| | Sb | Sn | Zn | B | Te | Se | Bi | Pb | Li | Na | K | Ba | Sr |
| D1 | | | | | | | | | | | | | |
| D2 | | | | | | | | | | | | | |
| D3 | | | | | | | | | | | | | |
| D4 | | | | 0.0017 | | | | | | | | | |
| D5 | 0.0048 | | | | | | | | | | | | |
| D6 | | | | 0.0019 | | | | | | | | | |
| D7 | | | | | 0.004 | | 0.09 | | | | | | |
| D8 | | | | | | | | | | | | | |
| D9 | | | | | | | | | | | | | |
| D10 | | | | | | | | | | | | | |
| D11 | | | | | | | | | | | | | |
| D12 | | | | | | | | | | | | | |
| D13 | | | | | | | | | | | | | |
| E1 | | | 0.08 | | | | | | | | | | |
| E2 | | 0.10 | | 0.0021 | | | | | 0.0001 | | | 0.0001 | |
| E3 | | | | | | | | | | | | | |
| E4 | | | | | | | | | | | | | |
| E5 | | | 0.014 | 0.0005 | | 0.0022 | | 0.13 | | 0.0001 | 0.0001 | | 0.0001 |
| E6 | 0.0020 | 0.08 | | | 0.010 | | | | | | | | |
| E7 | 0.0100 | | | 0.0045 | | | | | | | | | |
| E8 | | | | | | | | 0.25 | 0.20 | 0.0004 | | | |
| E9 | | | | | | | | | | | | | |
| E10 | | | | | | | | | | | | | |
| E11 | | | | | | | | | | | | | |
| E12 | | | | | | | | | | | | | |

Figure 1B:
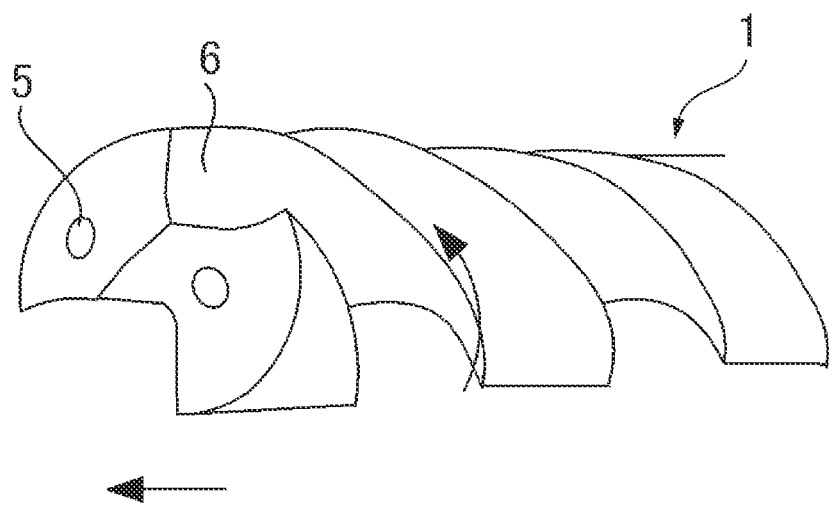
FIG. 1B is a perspective view of a drill used for the evaluation test of the service life of a tool.

The outline of the evaluation test of the service life of a tool is shown in FIG. 1A. As shown in FIG. 1A, a carbide coating drill 1 having fluid holes was installed to the main spindle of a horizontal machining center, and drilling was performed at a drilling position 4 on the specimen for the evaluation test of the service life of a tool (test specimen) 3 fixed by a vice while mist 2, which is a mixture of a carrier gas and a cutting fluid, was blown from the fluid holes in the drill (tool) 1. As shown in FIG. 1B, fluid holes 5 are provided at the cutting edge having a flank 6 in the drill 1. In addition, in FIGS. 1A and 1B, the bending arrow indicates the rotation direction, and the straight arrow indicates the feed direction of the drill.

Tables 6 and 7 show a variety of conditions for cutting in the evaluation tests of the service life of tools. With regard to the concentration of oxygen in the carrier gas, air was used as a gas having an oxygen concentration of 21%. In addition, a gas having an oxygen concentration larger than 21% was prepared using an oxygen concentrator. A gas having an oxygen concentration smaller than 21% was prepared by mixing nitrogen into air. Oxygen concentrations $C_{O2}$ (%) were measured using an oxygen meter. The amount of the cutting fluid q (ml/hour) was obtained using the specific gravity of the cutting fluid from the weight variation per unit time obtained by applying the mist to a non-woven fabric. The flux Q (1/minute) of the carrier gas and the supply pressure P (MPa) of the carrier gas were measured respectively using a flow meter and a pressure meter mounted on a mist-generating apparatus. The pump shot frequency N (Hz) was obtained by measuring the number of times of opening and closing of an air electromagnetic valve in the mist-generating apparatus. The temperature T (° C.) of the carrier gas was measured using a thermometer. A gas of 0° C. or lower was prepared using an air cooling apparatus, and a gas of 40° C. or higher was prepared using a heater for heated gas. Gases in a temperature range other than the above were obtained by adjusting the air temperature in the laboratory. The cross-sectional area S (mm$^2$) of an ejection opening of mist was calculated from the diameter $d_h$ of the fluid hole (the diameter of the opening) opened in the drill. Since the drill used for the tests had two fluid holes, the sum of the cross-sectional areas of the two fluid holes was used. Since the diameter of the fluid hole varies with the diameter of the drill, the tests were performed with the varied cross-sectional areas of the ejection opening of mist using several drills having different diameters. When the diameters of drills are different, cutting resistance varies, and, consequently, the amount of tool wear also varies. Therefore, tool wear was compared using drills having the same diameter. Table 8 shows other cutting conditions. After 800 times of drilling, tool wear was evaluated by measuring the maximum wear width VB_max of the flank in a cutting edge (tool) which was more worn than the other cutting edge of the drill using a microscope, and, when the amount of tool wear (the maximum wear width VB_max) was 100 μm or lower, the cutting method was evaluated as excellent. Tables 6 and 7 show the measurement results of the amount of tool wear. Meanwhile, in Tables 1 and 2, conditions not satisfying the conditions of the present invention are underlined.

TABLE 6

| Test No. | $C_{O2}$ (%) | q (ml/hour) | Q (l/minute) | q/Q | dh (mm) | S (mm$^2$) | P (MPa) | S/P | N (Hz) | T (° C.) | VB_max (μm) |
|---|---|---|---|---|---|---|---|---|---|---|---|
| A1 | 40 | 3.5 | 20 | 0.179 | 0.4 | 0.251 | 0.8 | 0.31 | 2.0 | 20 | 41 |
| A2 | 40 | 1 | 24 | 0.041 | 0.4 | 0.251 | 1.0 | 0.25 | 0.5 | 15 | 52 |
| A3 | 25 | 15.5 | 20 | 0.791 | 0.4 | 0.251 | 0.8 | 0.31 | 0.1 | 10 | 62 |
| A4 | 21 | 0.15 | 20 | 0.008 | 0.4 | 0.251 | 0.8 | 0.31 | 0.5 | 0 | 56 |
| A5 | 21 | 8 | 20 | 0.408 | 0.4 | 0.251 | 0.8 | 0.31 | 0.5 | −5 | 51 |
| A6 | 21 | 1.5 | 15 | 0.100 | 0.4 | 0.251 | 0.6 | 0.42 | 0.1 | −30 | 61 |
| A7 | 30 | 6.8 | 8 | 0.820 | 0.4 | 0.251 | 0.3 | 0.84 | 1.0 | 25 | 50 |
| A8 | 25 | 8 | 11 | 0.758 | 0.4 | 0.251 | 0.4 | 0.63 | 0.5 | 40 | 55 |
| A9 | <u>15</u> | 1 | 20 | 0.051 | 0.4 | 0.251 | 0.8 | 0.31 | 0.5 | 20 | 107 |
| A10 | 25 | <u>0.008</u> | 15 | 0.001 | 0.4 | 0.251 | 0.6 | 0.42 | 1.0 | 0 | 123 |
| A11 | 40 | 8 | 33 | 0.241 | 0.4 | 0.251 | 1.4 | 0.18 | 2.0 | −30 | 108 |
| A12 | 21 | 3.5 | 15 | 0.232 | 0.4 | 0.251 | 0.6 | 0.42 | 0.1 | 10 | 128 |
| A13 | 40 | 8 | 33 | 0.241 | 0.4 | 0.251 | 1.4 | 0.18 | 2.0 | −30 | 212 |
| B1 | 21 | 12 | 78 | 0.153 | 0.8 | 1.005 | 0.8 | 1.26 | 0.5 | 0 | 61 |
| B2 | 25 | 3.4 | 60 | 0.056 | 0.8 | 1.005 | 0.6 | 1.67 | 3.0 | −10 | 45 |
| B3 | 30 | 1.5 | 60 | 0.025 | 0.8 | 1.005 | 0.6 | 1.67 | 1.0 | 25 | 55 |
| B4 | 21 | 15 | 24 | 0.622 | 0.8 | 1.005 | 0.2 | 5.02 | 0.5 | 15 | 65 |
| B5 | 21 | 17 | 78 | 0.217 | 0.8 | 1.005 | 0.8 | 1.26 | 0.5 | 5 | 60 |
| B6 | 30 | 5.3 | 60 | 0.088 | 0.8 | 1.005 | 0.6 | 1.67 | 3.0 | 30 | 50 |
| B7 | 21 | 0.05 | 42 | 0.001 | 0.8 | 1.005 | 0.4 | 2.51 | 0.5 | −70 | 80 |
| B8 | 30 | 0.05 | 78 | 0.0006 | 0.8 | 1.005 | 0.8 | 1.26 | 0.5 | 0 | 130 |
| B9 | 25 | 3.4 | 60 | 0.056 | 0.8 | 1.005 | 0.6 | 1.67 | 1.0 | 45 | 126 |
| B10 | 21 | 15 | 78 | 0.191 | 0.8 | 1.005 | 0.8 | 1.26 | 3.0 | 0 | 125 |
| B11 | 30 | 1.5 | 42 | 0.036 | 0.8 | 1.005 | 0.4 | 2.51 | 1.0 | −70 | 120 |
| B12 | 25 | 17 | 78 | 0.217 | 0.8 | 1.005 | 0.8 | 1.26 | 0.5 | 30 | 135 |
| B13 | <u>15</u> | 3.4 | 60 | 0.056 | 0.8 | 1.005 | 0.6 | 1.67 | 1.0 | 45 | 230 |
| C1 | 25 | 22 | 176 | 0.125 | 1.2 | 2.261 | 0.8 | 2.83 | 0.5 | 30 | 63 |
| C2 | 21 | 5.3 | 136 | 0.039 | 1.2 | 2.261 | 0.6 | 3.77 | 15.0 | 5 | 83 |
| C3 | 21 | 8 | 115 | 0.069 | 1.2 | 2.261 | 0.5 | 4.52 | 4.0 | 20 | 62 |
| C4 | 30 | 5 | 115 | 0.043 | 1.2 | 2.261 | 0.5 | 4.52 | 0.5 | −20 | 43 |
| C5 | 30 | 10 | 115 | 0.087 | 1.2 | 2.261 | 0.5 | 4.52 | 2.0 | 10 | 48 |
| C6 | 21 | 1 | 115 | 0.009 | 1.2 | 2.261 | 0.5 | 4.52 | 0.5 | −40 | 64 |
| C7 | 35 | 32 | 176 | 0.181 | 1.2 | 2.261 | 0.8 | 2.83 | 0.1 | 0 | 49 |
| C8 | 25 | 5.3 | 136 | 0.039 | 1.2 | 2.261 | 0.6 | 3.77 | 3.0 | 25 | 58 |
| C9 | 21 | 10 | 136 | 0.074 | 1.2 | 2.261 | 0.6 | 3.77 | 0.04 | 0 | 149 |
| C10 | 30 | 5.3 | 115 | 0.046 | 1.2 | 2.261 | 0.5 | 4.52 | 2.0 | 5 | 144 |
| C11 | 25 | 22 | 176 | 0.125 | 1.2 | 2.261 | 0.8 | 2.83 | 0.5 | −40 | 148 |
| C12 | 30 | 1 | 136 | 0.007 | 1.2 | 2.261 | 0.6 | 3.77 | 3.0 | 0 | 150 |
| C13 | 21 | 10 | 136 | 0.074 | 1.2 | 2.261 | 0.6 | 3.77 | 0.04 | 0 | 252 |

*The underlined values in this table indicate that those values fail to satisfy the conditions of the present invention.
*$C_{O2}$: the concentration of oxygen in the carrier gas, q: the amount of the cutting fluid, Q: the flow rate of the carrier gas, dh: the diameter of the fluid hole, S: the cross-sectional area of the ejection opening of mist, P: the supply pressure of the carrier gas, N: the pump shot frequency, T: the temperature of the carrier gas, and VB_max: the maximum wear width of the flank in a tool

TABLE 7

| Test No. | $C_{O2}$ (%) | q (ml/hour) | Q (l/minute) | q/Q | dh (mm) | S (mm$^2$) | P (MPa) | S/P | N (Hz) | T (° C.) | VB_max (μm) |
|---|---|---|---|---|---|---|---|---|---|---|---|
| D1 | 21 | 5.6 | 241 | 0.023 | 1.6 | 4.019 | 0.6 | 6.70 | 3.0 | −5 | 64 |
| D2 | 35 | 90 | 241 | 0.373 | 1.6 | 4.019 | 0.6 | 6.70 | 6.0 | 10 | 65 |
| D3 | 30 | 1 | 205 | 0.005 | 1.6 | 4.019 | 0.5 | 8.04 | 0.5 | 15 | 60 |
| D4 | 25 | 140 | 313 | 0.447 | 1.6 | 4.019 | 0.8 | 5.02 | 4.0 | 20 | 79 |

TABLE 7-continued

| Test No. | $C_{O2}$ (%) | q (ml/hour) | Q (l/minute) | q/Q | dh (mm) | S (mm$^2$) | P (MPa) | S/P | N (Hz) | T (° C.) | VB_max (µm) |
|---|---|---|---|---|---|---|---|---|---|---|---|
| D5 | 21 | 5.6 | 313 | 0.018 | 1.6 | 4.019 | 0.8 | 5.02 | 3.0 | 0 | 59 |
| D6 | 35 | 3 | 313 | 0.010 | 1.6 | 4.019 | 0.8 | 5.02 | 0.5 | 35 | 60 |
| D7 | 25 | 10 | 205 | 0.049 | 1.6 | 4.019 | 0.5 | 8.04 | 2.0 | 25 | 58 |
| D8 | 35 | 160 | 133 | 1.206 | 1.6 | 4.019 | 0.3 | 13.40 | 4.0 | 0 | 173 |
| D9 | 21 | 5.6 | 241 | 0.023 | 1.6 | 4.019 | 0.6 | 6.70 | 18.0 | −5 | 172 |
| D10 | 30 | 3 | 60 | 0.050 | 1.6 | 4.019 | 0.1 | 40.19 | 3.0 | 15 | 162 |
| D11 | 25 | 90 | 313 | 0.287 | 1.6 | 4.019 | 0.8 | 5.02 | 0.5 | 20 | 177 |
| D12 | 35 | 10 | 205 | 0.049 | 1.6 | 4.019 | 0.5 | 8.04 | 2.0 | 25 | 167 |
| D13 | 35 | <u>220</u> | 133 | 1.659 | 1.6 | 4.019 | 0.3 | 13.40 | 4.0 | 0 | 267 |
| E1 | 40 | <u>6.2</u> | 377 | 0.016 | 2.0 | 6.280 | 0.6 | 10.47 | 3.0 | 20 | 83 |
| E2 | 21 | 50 | 264 | 0.190 | 2.0 | 6.280 | 0.4 | 15.70 | 1.0 | 5 | 73 |
| E3 | 21 | 50 | 490 | 0.102 | 2.0 | 6.280 | 0.8 | 7.85 | 3.0 | 5 | 67 |
| E4 | 21 | 10 | 264 | 0.038 | 2.0 | 6.280 | 0.4 | 15.70 | 4.0 | 15 | 72 |
| E5 | 21 | 180 | 377 | 0.478 | 2.0 | 6.280 | 0.6 | 10.47 | 4.0 | 15 | 82 |
| E6 | 21 | 30 | 264 | 0.114 | 2.0 | 6.280 | 0.4 | 15.70 | 0.5 | −5 | 71 |
| E7 | 21 | 25 | 207 | 0.121 | 2.0 | 6.280 | 0.3 | 20.93 | 2.0 | 0 | 77 |
| E8 | 25 | 65 | 151 | 0.431 | 2.0 | 6.280 | 0.2 | 31.40 | 8.0 | 20 | 81 |
| E9 | 40 | <u>240</u> | 490 | 0.490 | 2.0 | 6.280 | 0.8 | 7.85 | 3.0 | −5 | 176 |
| E10 | 25 | 50 | 122 | 0.408 | 2.0 | 6.280 | 0.2 | 41.87 | 1.0 | 0 | 181 |
| E11 | 21 | 10 | 377 | 0.027 | 2.0 | 6.280 | 0.6 | 10.47 | 3.0 | 15 | 192 |
| E12 | 21 | 25 | 264 | 0.095 | 2.0 | 6.280 | 0.4 | 15.70 | 4.0 | 5 | 191 |

*The underlined values in this table indicate that those values fail to satisfy the conditions of the present invention.
*$C_{O2}$: the concentration of oxygen in the carrier gas, q: the amount of the cutting fluid, Q: the flow rate of the carrier gas, dh: the diameter of the fluid hole, S: the cross-sectional area of the ejection opening of mist, P: the supply pressure of the carrier gas, N: the pump shot frequency, T: the temperature of the carrier gas, and
VB_max: the maximum wear width of the flank in a tool

TABLE 8

| Cutting Conditions | Speed | 67 m/minite |
|---|---|---|
| | Feed Rate | 0.16 mm/rev |
| | Hole Depth | A1 to A12: 30 mm |
| | | B1 to B12: 60 mm |
| | | C1 to C12: 90 mm |
| | | D1 to D12: 60 mm |
| | | E1 to E12: 75 mm |
| Mist Conditions | Cutting Fluid | Biodegradable Ester |
| | Supply Method | Fluid Supply through Spindle Center (Internal Fluid Supply) |
| Machine Tool | | Horizontal Machining Center |
| Drill | Diameter | A1 to A12: 3 mm |
| | | B1 to B12: 6 mm |
| | | C1 to C12: 9 mm |
| | | D1 to D12: 12 mm |
| | | E1 to E12: 15 mm |
| | Material | TiAlN Coated Cemented Carbide |

As shown in Tables 1 to 7, in Test Nos. A1 to A8, B1 to B7, C1 to C8, D1 to D7, and E1 to E8, tool wear was small, and excellent service lives of tools were obtained. Even when elements were added to increase strength, control the morphology of sulfides, or the like, sufficient machinability was obtained by sufficiently optimizing the chemical composition and the cutting conditions of a steel material.

In addition, in Test Nos. A11, B8, B9, C9, D8 to D10, and E10, the amount of Al, the concentration of oxygen in the carrier gas, and the amount of the cutting fluid in the carrier gas were appropriately controlled. As a result, in these Test Nos., tool wear was improved due to the formation of a protective film of an oxide containing alumina as the main oxide on the tool. For example, in Test No. A11, the tool wear was improved in comparison to Test No. A13, in which the amount of Al was 0.05% or less. In Test No. B9, the tool wear was improved in comparison to Test No. B13, in which the concentration of oxygen in the carrier gas was lower than 21%. In Test No. C9, the tool wear was improved in comparison to Test No. C13, in which the amount of Al was 1.0% or more. In Test No. D8, the tool wear was improved in comparison to Test No. D13, in which the supply rate of the cutting fluid exceeded 200 ml.

In addition, in Test Nos. A9 to A13, B8 to B13, C9 to C13, D8 to D13, and E9 to E12, in comparison to other Test Nos., there were cases in which work materials or the cutting conditions were not optimized.

In Test No. A9, since the concentration of oxygen in the carrier gas was lower than 21%, that is, an oxidizing gas was not used as the carrier gas, it was difficult for the solute Al in the work material and oxygen in the mist to chemically react. Therefore, in Test No. A9, the effect of forming a protective film of an oxide containing alumina as the main oxide on a tool so as to improve the service life of the tool was not obtained, and, in comparison to Test No. A2, tool wear increased. In Test No. A10, since the amount of the cutting fluid in the mist was too small, a lubrication action was not obtained, and in comparison to Test No. A3, tool wear increased. In Test No. A11, in comparison to Test No. A1, since the value S/P, which is obtained by a division of the cross-sectional area of the ejection opening S (mm$^2$) by the supply pressure P (MPa), was too small, the particle diameter of mist increased significantly. Therefore, in Test No. A11, in comparison to Test No. A1, too much cutting fluid was adhered to the tool, and it was difficult to generate an oxide containing alumina as the main oxide on the tool, and therefore tool wear increased. In Test No. A12, since the amount of Al is not sufficient, it was difficult for the solute Al in the work material and oxygen in the mist to chemically react. As a result, in Test No. A12, the effect of forming a protective film of an oxide containing alumina as the main oxide on a tool was not obtained, and, in comparison to Test No. A6, tool wear increased. In Test No. A13, since the amount of Al was insufficient, chemical reaction between the solute Al in the work material and oxygen in the mist rarely occurred. As a result, in Test No. A13, in comparison to Test No. A11, tool wear increased.

In Test No. B8, in comparison to Test No. B3, since the value q/Q, which is obtained by a division of the amount of the cutting fluid q (ml/hour) by the flow rate of the carrier gas Q (l/minute), was too small, it was difficult to obtain a lubrication action, and tool wear increased. In Test No. B9, in comparison to Test No. B2, since the temperature of the carrier gas was too high, the cooling effect was small, and the amount of heat was large. As a result, in Test No. B9, in comparison to Test No. B2, tool wear increased. In Test No. B10, since the amount of Al was insufficient, it was difficult for the solute Al in the work material and oxygen in the mist to chemically react. As a result, in Test No. B10, the effect of forming a protective film of an oxide containing alumina as the main oxide on a tool was not obtained, and, in comparison to Test No. B4, tool wear increased. In Test No. B11, the amount of Al was 0.05% or more, but the equation (1) was not satisfied, and therefore it was difficult for the solute Al in the work material and oxygen in the mist to chemically react. As a result, in Test No. B11, the effect of forming a protective film of an oxide containing alumina as the main oxide on a tool was not obtained, and, in comparison to Test No. B3, tool wear increased. In Test No. B12, since the amount of Al was excessive, a number of hard oxides having a high melting point were present in the work material, and, in comparison to Test No. B2, tool wear increased. In Test No. B13, since the concentration of oxygen in the carrier gas was lower than 21%, chemical reaction between the solute Al in the work material and oxygen in the mist rarely occurred. As a result, in Test No. B13, the effect of improving the service life of a tool by forming a protective film of an oxide containing alumina as the main oxide on a tool was not obtained, and, in comparison to Test No. B9, tool wear increased.

In Test No. C9, in comparison to Test No. C3, since the pump shot frequency was too small, it was difficult to obtain a lubrication action, and tool wear increased. In Test No. C10, since the amount of C was excessive, a number of hard carbides were precipitated in the work material, and, in comparison to Test No. C4, the machinability was degraded. In Test No. C11, since the amount of Si was excessive, the hardness of the work material became large, and, in comparison to Test No. C1, the machinability was degraded. In Test No. C12, since the amount of Mn was excessive, the hardness of the work material became large, and, in comparison to Test No. C6, the machinability was degraded. In Test No. C13, since the amount of Al was excessive, a number of hard oxides having a high melting point were present in the work material, and, in comparison to Test No. C9, tool wear increased.

In Test No. D8, in comparison to Test No. D2, since the value q/Q, which is obtained by a division of the amount of the cutting fluid q (ml/hour) by the flow rate of the carrier gas Q (l/minute), was too large, it was difficult to generate an oxide containing alumina as the main oxide on the tool with mist adhered to the tool. As a result, in Test No. D8, in comparison to Test No. D2, tool wear increased. In Test No. D9, in comparison to Test No. D1, since the pump shot frequency was too large, it was difficult to generate an oxide containing alumina as the main oxide on the tool with mist adhered to the tool. As a result, in Test No. D9, in comparison to Test No. D1, tool wear increased. In Test No. D10, in comparison to Test No. D3, since the value S/P, which is obtained by a division of the cross-sectional area of the ejection opening S (mm$^2$) by the supply pressure P (MPa), was too large, the particle diameter of mist became small. As a result, in Test No. D10, in comparison to Test No. D3, little mist was adhered to the tool, it was difficult to obtain the lubrication effect, and tool wear increased. In Test No. D11, since the amount of O was excessive, a number of coarse oxide-based inclusions were present in the work material, and abrasive wear occurred. As a result, in Test No. D11, in comparison to Test No. D7, tool wear increased. In Test No. D12, since the amount of Ca was excessive, a large amount of CaS was present in the work material, and, in comparison to Test No. D3, the machinability was degraded. In Test No. D13, since the amount of the cutting fluid was too large in the mist, the mist adhered to the tool hindered the generation of a protective film of an oxide containing alumina as the main oxide on the tool. As a result, in Test No. D13, in comparison to Test No. D8, tool wear increased.

In Test No. E9, since the amount of the cutting fluid was too large in the mist, the mist adhered to the tool hindered the generation of a protective film of an oxide containing alumina as the main oxide on the tool. As a result, in Test No. E9, in comparison to Test No. E1, tool wear increased. In Test No. E10, in comparison to Test No. E8, since the value S/P, which is obtained by a division of the cross-sectional area of the ejection opening S (mm$^2$) by the supply pressure P (MPa), was too large, the particle diameter of mist became small. As a result, in Test No. E10, in comparison to Test No. E8, little mist was adhered to the tool, it was difficult to obtain the lubrication effect, and tool wear increased. In Test No. E11, since the amount of Rem was excessive, a number of Rem sulfides were present in the work material, and, in comparison to Test No. E4, the machinability was degraded. In Test No. E12, since the amount of Ni added was excessive, in comparison to Test No. E4, the machinability was degraded.

Thus far, the examples have been described. As is evident from the examples, in the present invention, the service life of a tool is improved by performing MQL cutting in which a cutting fluid is made to take the form of mist by a carrier gas, and cutting is performed while the cutting fluid mist is blown on the cutting edge of the tool or the surface of a work material. The examples showed a case in which mist was supplied through fluid holes during drilling using a drill. However, the present invention can improve the service life of a tool in any type of continuous cutting, such as a turning operation, or a tapping, and interrupted cutting, such as a milling, an end milling, or a hobbing. Furthermore, the present invention can improve the service life of a tool when mist is supplied by a variety of methods for supplying mist, such as a method in which mist is sprayed to portions to be cut from a nozzle installed outside, or a method in which the tool holder in a machine tool is equipped with a function of supplying MQL mist. The MQL cutting shown in the examples is simply an example, and thus the point of the present invention is not limited to the statement in the examples and can be broadly interpreted based on the scope of claims.

INDUSTRIAL APPLICABILITY

It is possible to provide a cutting method of steel for machine structural use which contributes to the excellent service life of a tool when an extremely small amount of cutting fluid is made to take the form of mist by a carrier gas, and cutting is performed on steel for machine structural use while the cutting fluid mist is blown on the cutting edge of the tool or the surface of a work material.

| Reference Symbol List | |
|---|---|
| 1 | DRILL (TOOL) |
| 2 | MIST |
| 3 | SPECIMEN FOR EVALUATION TEST OF SERVICE LIFE OF TOOL (TEST SPECIMEN) |
| 4 | DRILLING POSITION |
| 5 | FLUID HOLE |
| 6 | FLANK |

What is claimed is:

1. A cutting method of a steel for machine structural use, the method comprising:
   forming a mist by mixing a cutting fluid supplied at a supply rate of 0.01 ml/hour to 200 ml/hour and an oxidizing gas containing, by volume %, 25 to 50% of oxygen,
   wherein, when a flow rate of the oxidizing gas is defined as Q (l/minute) and the supply rate of the cutting fluid is defined as q (ml/hour), a ratio of q/Q satisfies 0.001 to 1; and
   cutting the steel for machine structural use while the mist is blown on a cutting edge surface of a tool and a surface of the steel for machine structural use,
   wherein the steel for machine structural use includes, by mass %:
   C: 0.01% to 1.2%;
   Si: 0.005% to 3.0%;
   Mn: 0.05% to 3.0%;
   P: 0.001% to 0.2%;
   S: 0.001% to 0.35%;
   N: 0.002% to 0.035%;
   Al: 0.05% to 1.0%; and
   the balance consisting of Fe and inevitable impurities, and wherein
   O is limited to 0.003% or less, and
   the amount of Al [Al %] and the amount of N [N %] satisfy [Al %]−(27/14)×[N %]≥0.05.

2. The cutting method of the steel for machine structural use according to claim 1,
   wherein the steel for machine structural use further includes, by mass %, at least one selected from the group consisting of:
   Ca: 0.0001% to 0.02%;
   Ti: 0.0005% to 0.5%;
   Nb: 0.0005% to 0.5%;
   W: 0.0005% to 1.0%;
   V: 0.0005% to 1.0%;
   Ta: 0.0001% to 0.2%;
   Hf: 0.0001% to 0.2%;
   Mg: 0.0001% to 0.02%;
   Zr: 0.0001% to 0.02%;
   Rem: 0.0001% to 0.02%;
   Sb: 0.0001% to 0.015%;
   Sn: 0.0005% to 2.0%;
   Zn: 0.0005% to 0.5%;
   B: 0.0001% to 0.015%;
   Te: 0.0003% to 0.2%;
   Se: 0.0003% to 0.2%;
   Bi: 0.001% to 0.5%;
   Pb: 0.001% to 0.5%;
   Cr: 0.001% to 3.0%;
   Mo: 0.001% to 1.0%;
   Ni: 0.001% to 5.0%;
   Cu: 0.001% to 5.0%;
   Li: 0.00001% to 0.005%;
   Na: 0.00001% to 0.005%;
   K: 0.00001% to 0.005%;
   Ba: 0.00001% to 0.005%; and
   Sr: 0.00001% to 0.005%.

3. The cutting method of the steel for machine structural use according to claim 1 or 2,
   wherein, when a cross-sectional area of an outlet through which the mist is ejected is defined as S ($mm^2$), and a supply pressure of the oxidizing gas is defined as P (MPa), a ratio of S/P satisfies 0.2 to 40.

4. The cutting method of the steel for machine structural use according to claim 1 or 2,
   wherein the number of ejections per second of a delivery pump supplying the cutting fluid is 0.05 to 16.

5. The cutting method of the steel for machine structural use according to claim 1 or 2,
   wherein a temperature of the oxidizing gas is −80° C. to 40° C.

* * * * *